(12) United States Patent
Pandy (10) Patent No.: US 8,493,196 B2
(45) Date of Patent: Jul. 23, 2013

(54) ACB FOLLOWING DISTANCE ALERT AND WARNING ADJUSTMENT AS A FUNCTION OF FORWARD VEHICLE SIZE AND HOST VEHICLE MASS

(75) Inventor: Ananda Pandy, Avon, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 311 days.

(21) Appl. No.: 12/946,159

(22) Filed: Nov. 15, 2010

(65) Prior Publication Data

US 2012/0119894 A1    May 17, 2012

(51) Int. Cl.
*B60Q 1/00*    (2006.01)

(52) U.S. Cl.
USPC .......... 340/435; 340/436; 701/93; 701/96; 701/301; 342/70

(58) Field of Classification Search
USPC .............. 340/435, 436, 933, 936; 701/41, 701/96, 117, 301, 93; 342/70, 455; 42/40, 42/455
See application file for complete search history.

(56) References Cited

U.S. PATENT DOCUMENTS

| | | | |
|---|---|---|---|
| 6,347,274 B2 | 2/2002 | Kuramochi et al. | |
| 6,927,699 B2* | 8/2005 | Samukawa et al. | 340/903 |
| 6,989,738 B2* | 1/2006 | Suzuki et al. | 340/436 |
| 7,327,237 B2* | 2/2008 | Kimura et al. | 340/436 |
| 2007/0067081 A1 | 3/2007 | Ton | |
| 2010/0253493 A1* | 10/2010 | Szczerba et al. | 340/435 |

OTHER PUBLICATIONS

Bendix Wingman ACB Active Cruise with Braking, 2010—Operator's Manual, 24 pgs.
Bendix Service Data, Bendix Wingman ACB (Active Cruise with Braking) SD-13-3333, Jan. 2010, 30 pgs.
Malen et al., "Preliminary Vehicle Mass Estimation Using Empirical Subsystem Influence Coefficients," The FGPC-Mass Compounding Project Team, May 9, 2007, 47 pgs.
Eriksson, Andreas, "Implementation and Evaluation of a Mass Estimation Algorithm," KTH Electrical Engineering, Masters' Degree Project, Stockholm, Sweden, May 2009, XR-EE-RT 2009:004, 44 pgs.

* cited by examiner

*Primary Examiner* — Toan N Pham
(74) *Attorney, Agent, or Firm* — Fay Sharpe LLP (57) ABSTRACT

When employing an adaptive cruise-with-braking (ACB) system to control host vehicle following distance, a forward vehicle is detected using one or both of a radar sensor (14) and a camera sensor (82). The radar sensor classifies the forward vehicle as a motorcycle, passenger car, or heavy vehicle by comparing a detected radar signature to reference radar signatures for different vehicles. The camera sensor classifies the forward vehicle as a motorcycle, passenger car, or heavy vehicle by comparing a captured vehicle image to reference pixel and contrast profiles (PCPs) for different vehicles. An adaptive cruise control (ACC) module (12) selects and implements a following distance alert (FDA) protocol for the classified vehicle, where the FDA protocol prescribes following distance limits that inversely proportional to the size of the forward vehicle. Following distance limits can be further adjusted as a function of host vehicle mass.

20 Claims, 10 Drawing Sheets

ACB FOLLOWING DISTANCE ALERT AND WARNING ADJUSTMENT AS A FUNCTION OF FORWARD VEHICLE SIZE AND HOST VEHICLE MASS

BACKGROUND

The present application finds particular application in cruise-control systems in vehicles, particularly involving adaptive cruise-with-braking (ACB) systems. However, it will be appreciated that the described technique may also find application in other motor control systems, other vehicle systems, or other cruise control vehicle systems.

Heavy-duty vehicles, such as large trucks or tractor-trailers, busses, and the like often employ set-speed cruise control (SSCC) systems that govern acceleration when turned on. Additionally, an ACB system may be employed to control vehicle speed via foundation braking, engine torque reduction, and vehicle retarder to affect distance to a target forward vehicle. Conventional systems may provide warnings when a preset following distance is breached by a forward vehicle, in order to provide a driver the host vehicle, or tracking vehicle (i.e., the vehicle on which the ACB system is installed) with ample time to respond and avoid collision. A problem with conventional ACB systems is that they are unable to differentiate between forward vehicles of different sizes (e.g., between trucks, passenger vehicles, motorcycles, and the like), which may have different stopping capabilities.

The present innovation provides new and improved ACB systems and methods for heavy-duty vehicles that permit the ACB system to classify forward objects or vehicles as a function of forward vehicle size, provide an alert, and adapt a following distance strategy accordingly, which overcome the above-referenced problems and others.

SUMMARY

In accordance with one aspect, an adaptive cruise-with-braking (ACB) system that adjusts host vehicle following distance as a function of forward vehicle size includes a sensor on a host vehicle that detects a forward vehicle and classifies the forward vehicle as a function of the size of the forward vehicle, and an electronic stability program (ESP) module (32) that determines a mass of the host vehicle. The system further includes an adaptive cruise control (ACC) module that selects and initiates one of a plurality of following distance alert (FDA) protocols as a function of the size of the forward vehicle and the mass of the host vehicle.

In accordance with another aspect, a method for adjusting host vehicle following distance as a function of forward vehicle size includes detecting a forward object in front of a host vehicle, and determining whether the forward object is a low-mass vehicle, a high mass vehicle, or an unclassified object. When the forward object is determined to be a low mass vehicle, a determination is made regarding whether the vehicle is an automobile or a motorcycle. The method further includes initiating an automobile following distance alert (FDA) protocol when the forward vehicle is determined to be an automobile. Additionally, the method includes initiating a motorcycle FDA protocol when the forward vehicle is determined to be a motorcycle, and initiating a heavy vehicle FDA protocol when the forward vehicle is determined to be a heavy vehicle.

In accordance with another aspect, a system that facilitates adjusting following distance for a host vehicle as a function of host vehicle mass and forward vehicle size includes a sensor that detects the position of a forward vehicle relative to a host vehicle in which the sensor is installed, and a processor(s) that classifies the forward vehicle as one of a motorcycle, a passenger automobile, and a heavy vehicle. The processor initiates a following distance alert (FDA) protocol that is selected as a function of the forward vehicle classification the FDA protocol including one or more prescribed following distance limits, and adjusts the one or more following distance limits as a function of host vehicle mass, wherein the following distance adjustment is inversely proportional to the mass of the host vehicle.

One advantage is that host vehicle and forward vehicle safety is improved.

Another advantage is that false positive alerts are reduced, thereby reducing desensitization of the driver to the alerts.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Figure 1:
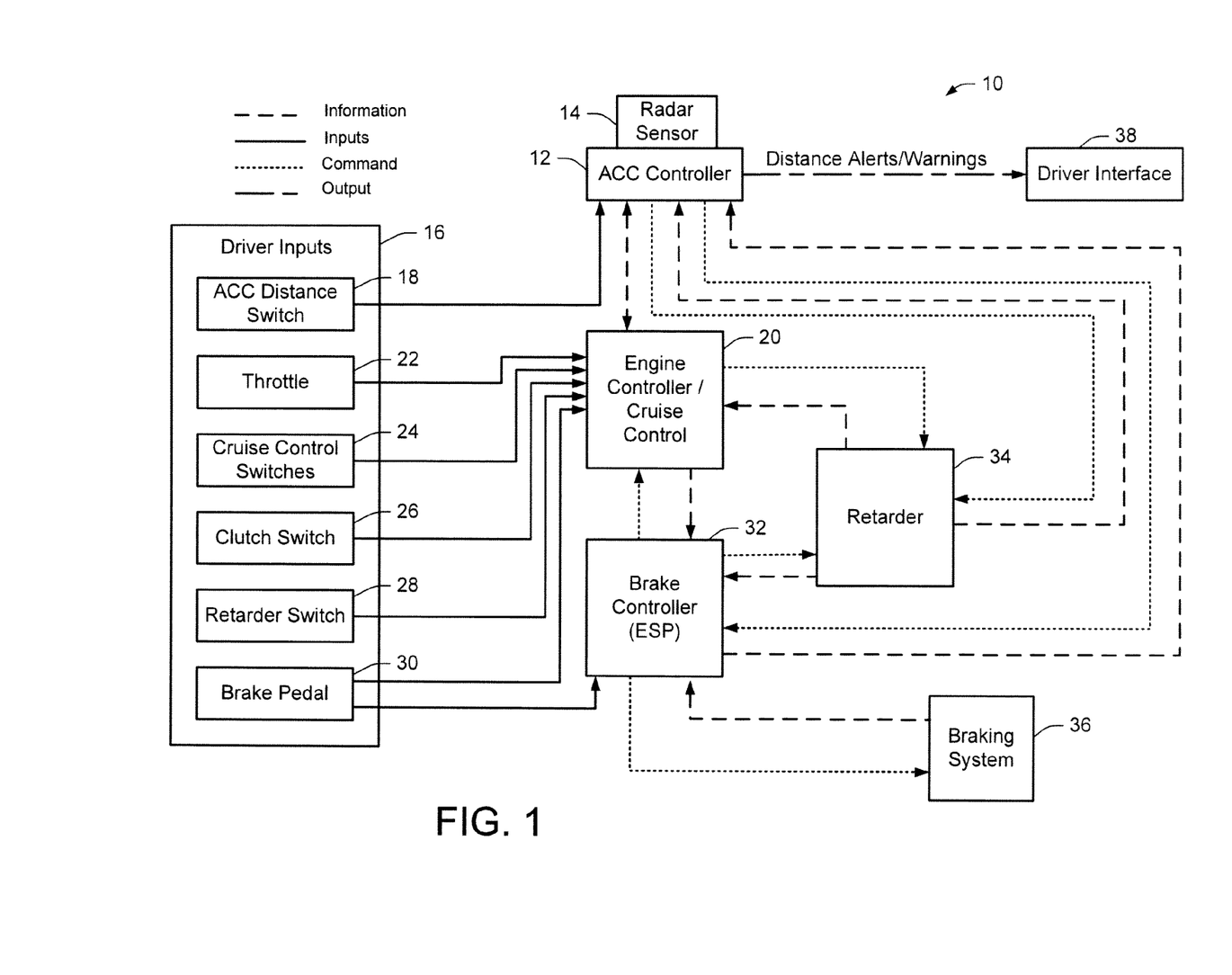
FIG. 1 illustrates an adaptive cruise-with-brake (ACB) system that facilitates adapting a following distance and warning strategy for a host vehicle as a function of the mass of the host vehicle and the size of a forward vehicle, as determined using a radar sensor.

FIG. 1 illustrates an adaptive cruise-with-brake (ACB) system 10 that facilitates adapting a following distance and warning strategy for a host vehicle as a function of the mass of the host vehicle and the size of a forward vehicle, as determined using a radar sensor. As used herein, "following distance" refers to a following window or time period (e.g., 3 seconds, 4 seconds, etc.) that the host vehicle maintains behind the target or forward vehicle, and is not to be construed as being limited to a static distance (e.g., 200 yards) or the like, since following distance changes with vehicle speed.

The system 10 includes an adaptive cruise control (ACC) module 12 that is coupled to a radar sensor 14 that classifies objects it detects on the road in front of the host vehicle to which it is mounted. For example, the radar sensor may receive a relatively small radar signature from a forward vehicle, and classify the forward vehicle as a motorcycle or the like. Motorcycles typically have better than average stopping capabilities (relative to passenger cars or commercial vehicles), whereas heavy commercial vehicles typically have lower than average stopping capabilities. When the radar sensor 14 detects and classifies a forward vehicle as a motorcycle, the ACC module 12 adjusts its following distance/warning strategy accordingly to increase the following distance of the host vehicle. In this manner, if the motorcycle suddenly applies the full extent of its braking system, the slower-stopping host vehicle has increased time to come to a complete stop without hitting the motorcycle.

A plurality of driver input devices 16 may be activated or employed by a driver of the host vehicle, including an ACC distance switch 18, which activates the ACC module 12 to control following distance according to one or more predefined following distance/warning strategies. Other input devices provide input to an engine controller/cruise control (ECC) component or module 20, and include a throttle 22, cruise control switches 24, a clutch switch 26, a retarder switch 28, and a brake pedal 30. Additionally, input from the brake pedal 30 is provided to a brake controller or electronic stability program (ESP) module 32, which then sends appropriate commands to the ECC 20, to an engine retarder 34, and to the vehicle's braking system 36. The system further includes a driver interface 38 via which distance alerts and warnings are presented to a driver in the event that, for instance, a forward vehicle breaches the following distance window ahead of the host vehicle.

Figure 2:
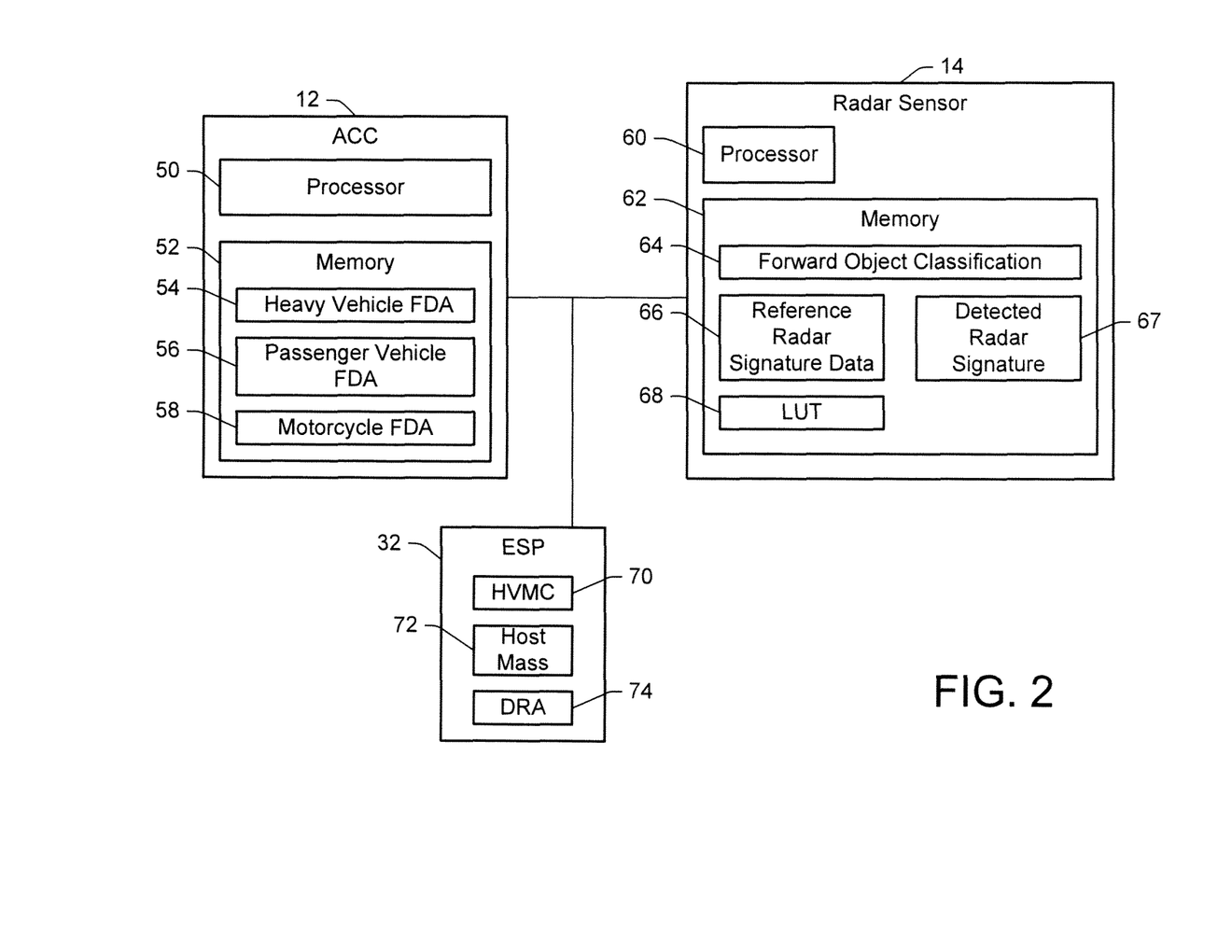
FIG. 2 illustrates the ACC module and radar sensor module in greater detail.

FIG. 2 illustrates the ACC module 12 and radar sensor module 14 in greater detail. The ACC module 12 comprises a processor 50 that executes, and a memory 52 that stores, a plurality of following distance alert (FDA) protocols that are employed for forward vehicles of different sizes and based on the host vehicle mass. For example, a first FDA protocol 54 includes a first predefined following distance (e.g., 3 seconds) that is employed when the forward vehicle is a heavy commercial vehicle (e.g., a tractor-trailer, a bus, etc.), etc.), since the forward vehicle has stopping characteristics similar to those of the host vehicle. A second FDA protocol 56 including a second predefined following distance (e.g., 3.5 seconds) may be employed when the forward vehicle is a passenger vehicle (e.g., a sedan, pickup truck, van, etc.), since the forward vehicle has stopping characteristics that are typically better than those of the host vehicle. A third FDA protocol 58 has a third predetermined following distance (e.g., 4 seconds) that is employed when the forward vehicle is smaller still, such as a motorcycle or motorized scooter, since the forward vehicle has substantially better stopping capabilities than the host vehicle. It will be appreciated that the described systems and methods may also be implemented in a passenger vehicle or the like, where FDA protocols are similarly designed to increase stopping distance when the detected forward vehicle has better stopping capabilities than the host vehicle, and decrease following distance when the host vehicle has better stopping capabilities than the forward vehicle.

The radar sensor module 14 comprises a processor 60 that executes, and a memory 62 that stores, a forward object classification module or algorithm 64 for classifying forward objects according to their respective radar signatures. Pre-generated or pre-collected reference radar signature data 66 for different objects (e.g., cars, motorcycles, large heavy-duty or commercial vehicles, road signs, reflective roadside litter, etc.) is stored in the memory 62, and the processor compares a detected radar signature to the radar signature data and accesses a lookup table 68 to identify an object corresponding to the detected radar signature. Once the detected object is classified (e.g., as a car, motorcycle, large commercial vehicle, etc.) by the processor 60, an appropriate FDA protocol is selected and implemented by the processor 50. It will be appreciated that, in other embodiments, the reference data 66 and associated comparisons/calculations can be stored in and/or performed by, for instance, an antilock braking system (ABS) coupled to the herein-described systems, and that the above-described components and functions are not limited to residing in the ACC module 12.

Additionally, the ESP module 32 (e.g., a processor or controller) includes a host vehicle mass calculator (HVMC) 70 that calculates a mass of the host vehicle. Calculation of the host vehicle mass may be performed using known techniques, such as a recursive least square (RLS) estimation technique. Such techniques are described in "Recursive Least Squares with Forgetting for Online Estimation of Vehicle Mass and Road Grade: Theory and Experiments," by Ardalan Vahidi et al., Vehicle System Dynamics, Volume 43, Issue 1 January 2005, pages 31-55, which is hereby incorporated by reference in its entirety herein. Other such estimation techniques are described in "Preliminary Vehicle Mass Estimation Using Empirical Subsystem Influence Coefficients," by D. Malen et al., Auto/Steel Partnership, 2007, which is hereby incorporated by reference in its entirety herein. In another embodiment, host vehicle mass is entered manually by the driver. Host vehicle mass data 72 is stored in the ESP module 32. A deceleration request adjustment (DRA) module 74 adjusts a deceleration request to the engine controller 20 as a function of the mass of the host vehicle. For instance, if the host vehicle is carrying a load of iron I-beams, then the magnitude of the deceleration requested will be increased relative to that requested for an empty host vehicle or a host vehicle carrying a light load (e.g., pillows, light bulbs, etc.).

Figure 3:
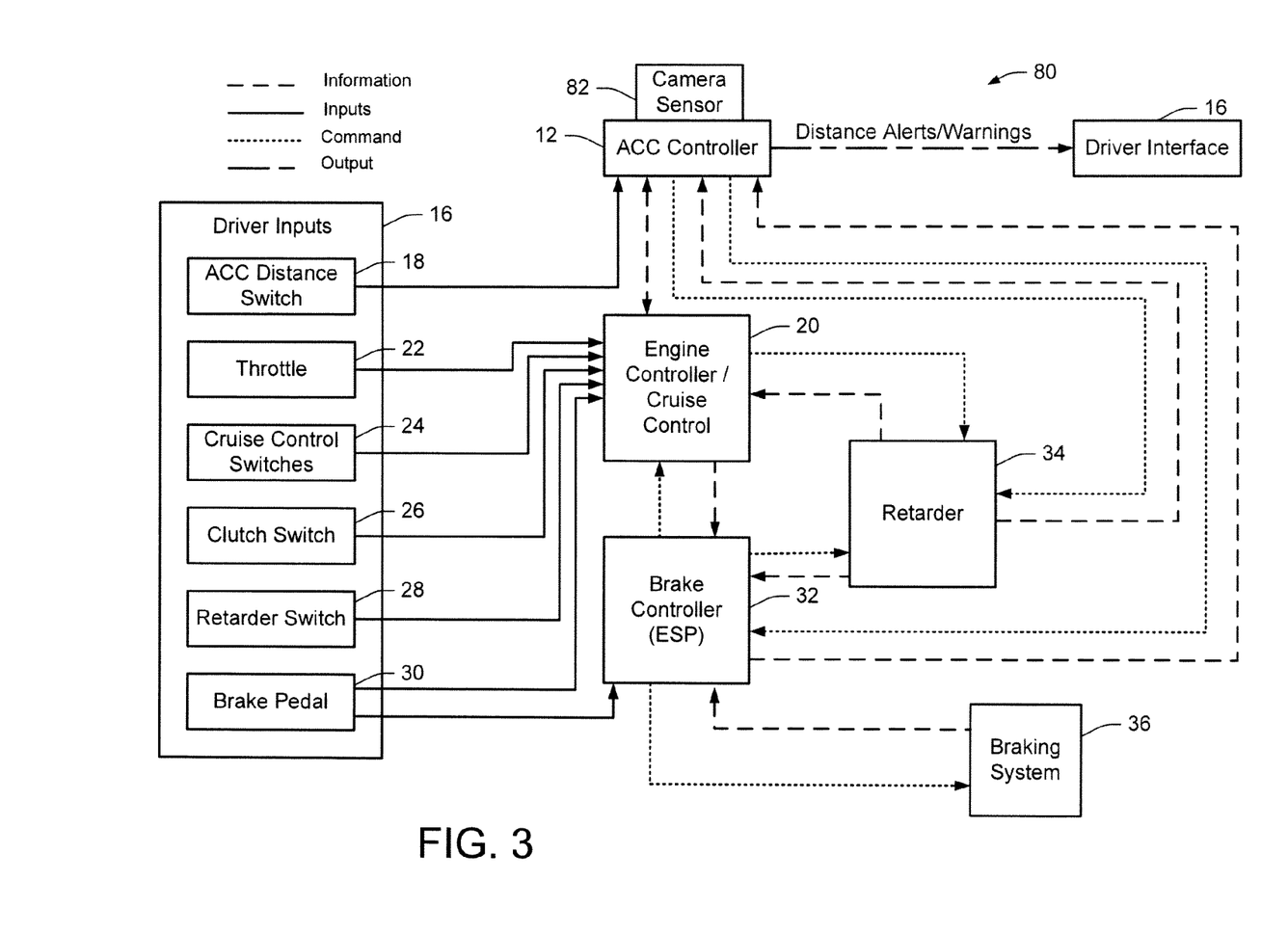
FIG. 3 illustrates an ACB system that that facilitates adapting a following distance and warning strategy for a host vehicle as a function of host vehicle mass and forward vehicle size, as determined using a camera sensor.

FIG. 3 illustrates an ACB system 80 that that facilitates adapting a following distance and warning strategy for a host vehicle as a function of host vehicle mass and forward vehicle size, as determined using a camera sensor. The system 80 includes the adaptive cruise control (ACC) module 12 coupled to a camera sensor 82 that classifies objects it detects on the road in front of the host vehicle to which it is mounted. For example, the camera sensor captures an image of a forward vehicle, and classifies the forward vehicle as a motorcycle, passenger car, commercial truck, or the like, based on a comparison of the captured image to stored images of vehicles. The system 80 further comprises the plurality of driver input devices 16 that may be activated or employed by a driver of the host vehicle, including the ACC distance switch 18, the throttle 22, cruise control switches 24, clutch switch 26, retarder switch 28, and brake pedal 30, as described with regard to FIG. 1. The system also includes the ECC 20, the brake controller or electronic stability program (ESP) module 32, the engine retarder 34, and the vehicle's braking system 36. The system further includes the driver interface 38 via which distance alerts and warnings are presented to a driver.

Figure 4:
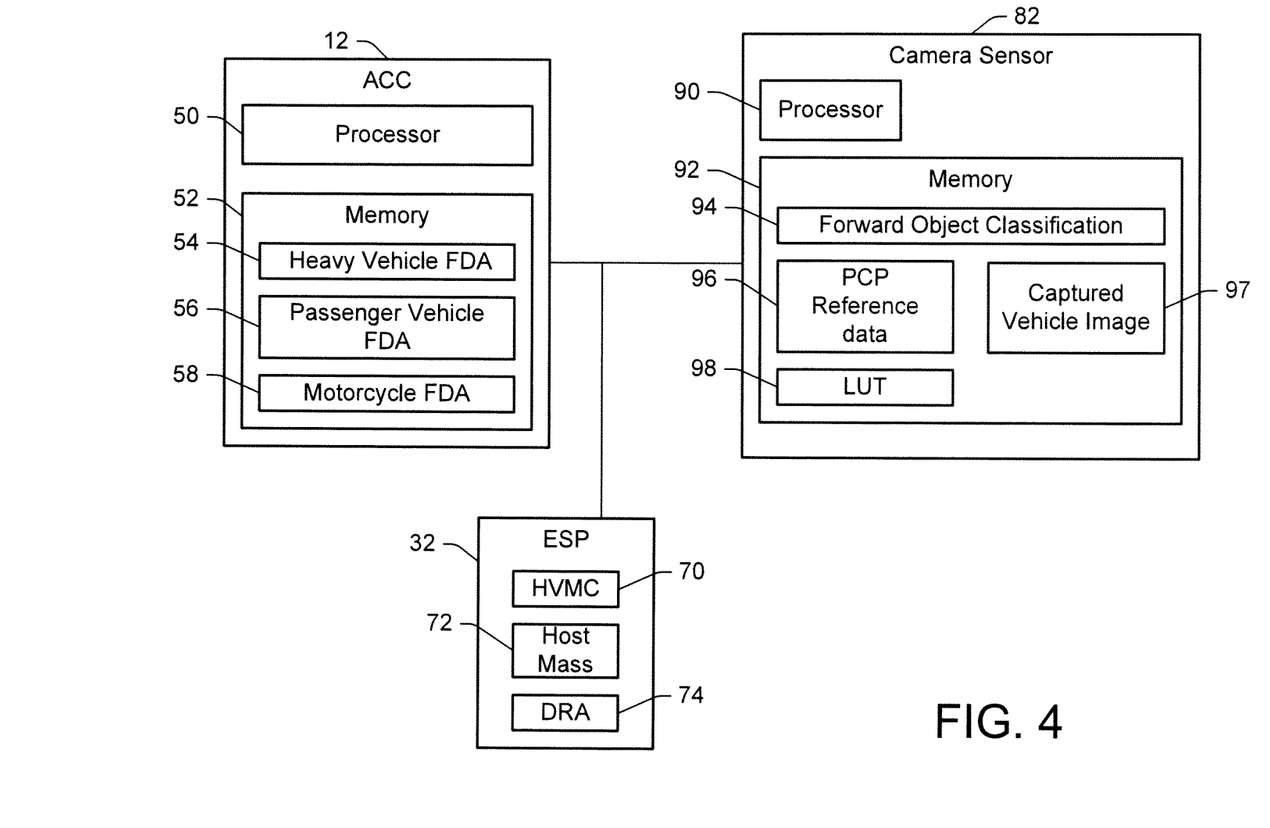
FIG. 4 illustrates the ACC module and camera sensor module in greater detail.

FIG. 4 illustrates the ACC module 12 and camera sensor module 82 in greater detail. The ACC module 12 comprises the processor 50 that executes, and the memory 52 that stores, the plurality of following distance/warning (FDA) protocols 54, 56, 58 that are employed for forward vehicles of different sizes and based on the host vehicle mass, as described with regard to FIG. 2.

The camera sensor module 82 comprises a processor 90 that executes, and a memory 92 that stores, a forward object classification module or algorithm 94 for classifying forward objects according to their respective pixel and contrast profiles (PCPs). Pre-generated or pre-collected reference PCP data 96 for different objects (e.g., cars, motorcycles, large heavy-duty or commercial vehicles, road signs, reflective roadside litter, etc.) is stored in the memory 92, and the processor compares a detected or captured vehicle image 97 to the PCP data and accesses a lookup table 98 to identify an object corresponding to the detected vehicle's PCP. Once the detected object is classified (e.g., as a car, motorcycle, large commercial vehicle, etc.) by the processor 90, an appropriate FDA protocol is selected and implemented by the processor 50. It will be appreciated that, in other embodiments, the reference data 96 and associated comparisons/calculations can be stored in and/or performed by, for instance, an antilock braking system (ABS) coupled to the herein-described systems, and that the above-described components and functions are not limited to residing in the ACC module 12.

Additionally, the ESP module 32 includes the host vehicle mass calculator (HVMC) 70 that calculates a mass of the host vehicle, as described with regard to FIG. 2. Host vehicle mass information may also be entered manually by the driver. Host vehicle mass data 72 is stored in ESP module 32. The DRA module 74 adjusts a deceleration request to the engine controller (FIG. 3) as a function of the mass of the host vehicle. For instance, if the host vehicle is carrying a load of cars, then the magnitude of the deceleration requested will be increased relative to that requested for an empty host vehicle or a host vehicle carrying a light load (e.g., wicker baskets, etc.).

Figure 5:
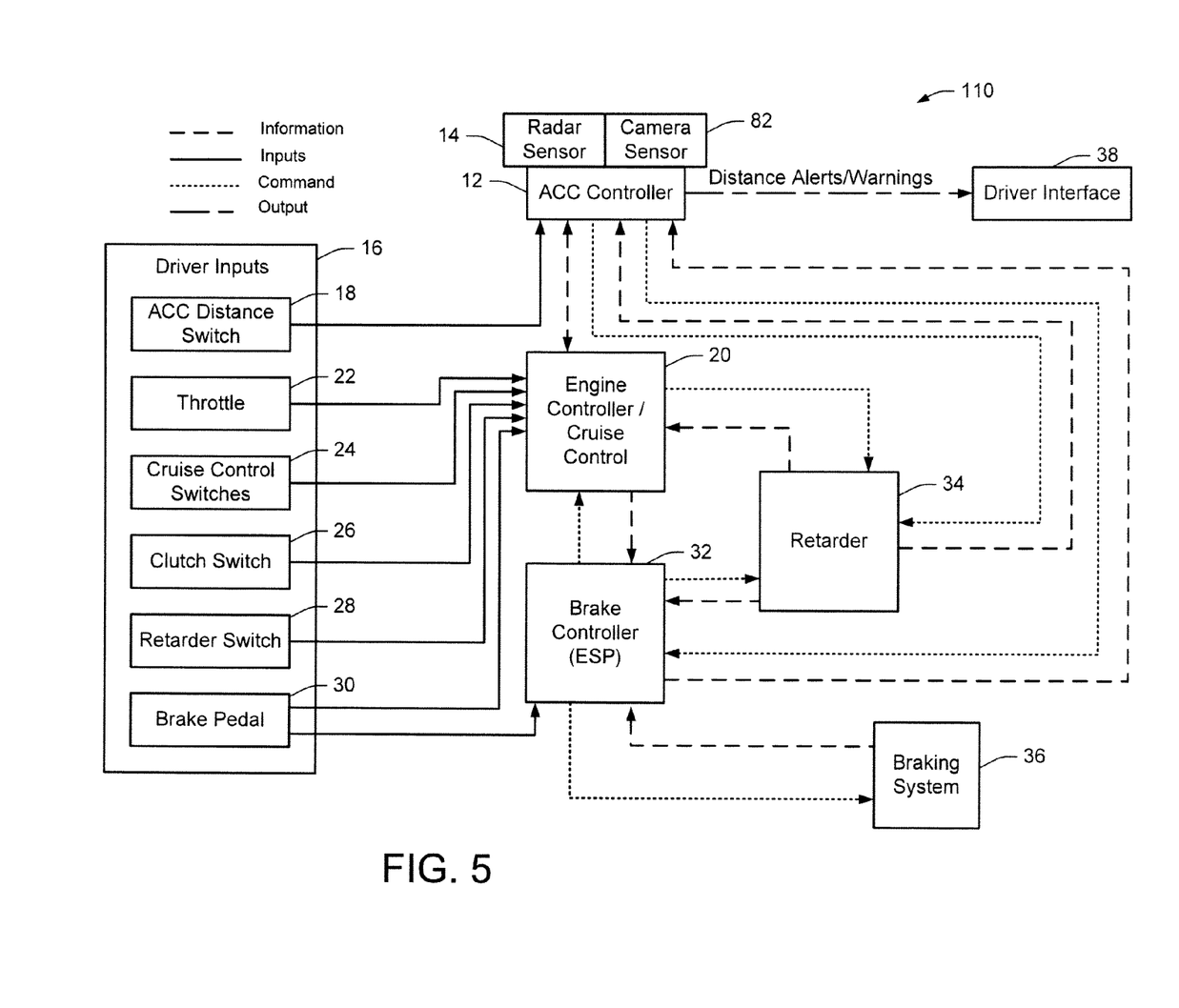
FIG. 5 illustrates an ACB system that employs both the radar sensor module and the camera sensor module.

FIG. 5 illustrates an ACB system 110 that employs both the radar sensor module 14 and the camera sensor module 82. The camera sensor and/or the radar sensor provides improved object classification, while the radar sensor permits object classification regardless of driving conditions (e.g., fog, long range to forward vehicle, etc.). The system 110 includes the ACC module, which is coupled to the radar sensor 14 (FIGS. 1 and 2) that classifies objects it detects on the road in front of the host vehicle to which it is mounted. For example, the radar sensor detects a radar signature from a forward vehicle, and classifies the forward vehicle as a function of the magnitude of the radar signature. The ACC module 12 is also coupled to the camera sensor 82 (FIGS. 3 and 4), which also classifies objects it detects on the road in front of the host vehicle to which it is mounted. For example, the camera sensor captures an image of a forward vehicle, and classifies the forward vehicle as a motorcycle, passenger car, commercial truck, or the like, based on a comparison of the PCP of the captured image to stored PCPs for images of different vehicles. The combined use of the camera sensor and the radar sensor permits sensor fusion (i.e., the combination of data from different sources, such that the combined information is more useful, more accurate, more dependable, etc., than if the data from the individual sources were used independently) in the system 110.

The system 110 further comprises the plurality of driver input devices 16 that may be activated or employed by a driver of the host vehicle, including the ACC distance switch 18, the throttle 22, cruise control switches 24, clutch switch 26, retarder switch 28, and brake pedal 30, as described with regard to FIGS. 1 and 3. The system also includes the ECC 20, the brake controller or electronic stability program (ESP) module 32, the engine retarder 34, and the vehicle's braking system 36. The system further includes the driver interface 38 via which distance alerts and warnings are presented to a driver.

Classification of the object is performed as a function of radar signature magnitude when the object is detected using radar, and as a function of PCP information contained in the object image when using a camera sensor system, as previously described herein. It will also be appreciated that the FDAs may be further adjusted as a function of the mass of the host vehicle, since a heavier host vehicle is capable of stopping in a shorter distance, due to increased traction, than a lighter host vehicle.

Figure 6:
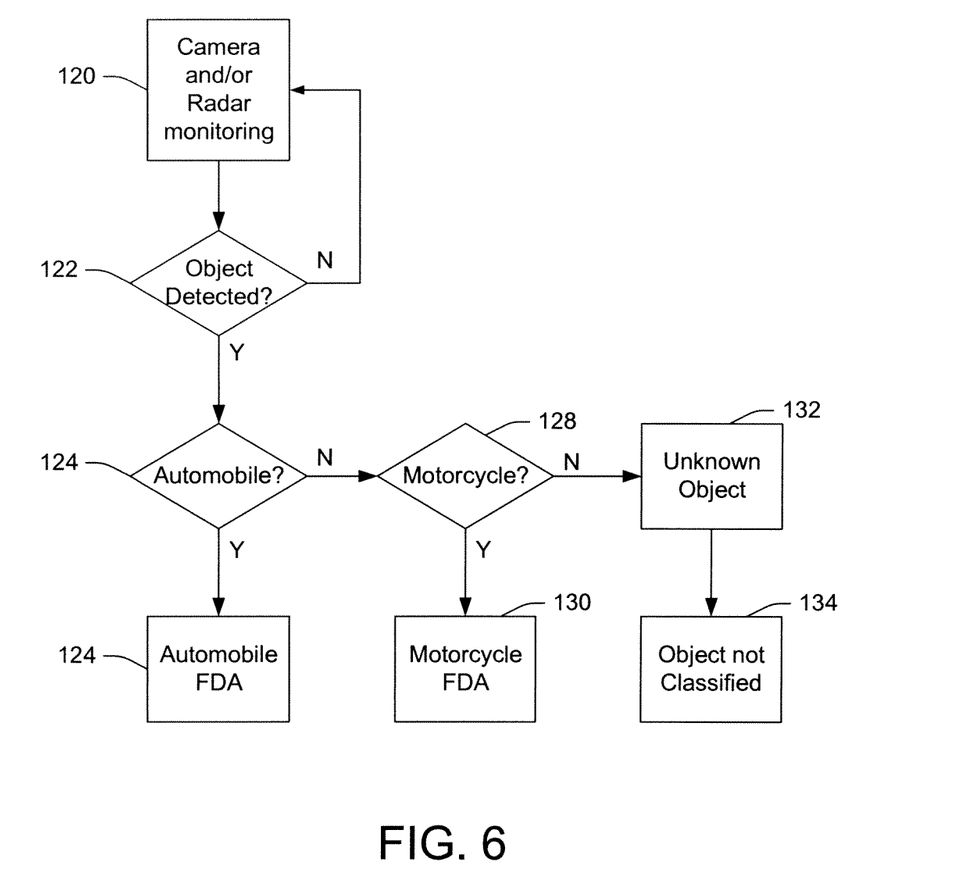
FIG. 6 illustrates a method of adjusting a following distance alert (FDA) protocol for a host vehicle as a function of forward vehicle size.

FIG. 6 illustrates a method of adjusting a following distance alert (FDA) protocol for a host vehicle as a function of forward vehicle size. At 120, camera and/or radar forward monitoring is performed. At 122, a determination is made regarding whether a forward object has been detected. If not, then the method reverts to 120, where forward monitoring is continued. If a forward object is detected, then at 124, a determination is made regarding whether the forward object is a passenger automobile. If the forward object is determined to be an automobile or other 4-wheeled vehicle, then at 126, an automobile FDA protocol is implemented to set a first following distance for the host vehicle. If the object is determined not to be an automobile or other 4-wheeled vehicle at 124, then at 128 a determination is made regarding whether the object is a motorcycle or other 2-wheeled vehicle. If so, then at 130 a motorcycle FDA protocol is implemented to set a second following distance for the host vehicle, which is longer than the first following distance. If the determination at 128 indicates that the object is not a 2-wheeled vehicle or motorcycle, then at 132 the object is identified as "unknown." At 134, the object is not classified or otherwise ignored. It will be appreciated that the determinations of whether the object is an automobile, a motorcycle, or unknown may be performed in any order, or concurrently, and are not limited to the ordering represented in FIG. 6.

Figure 7:
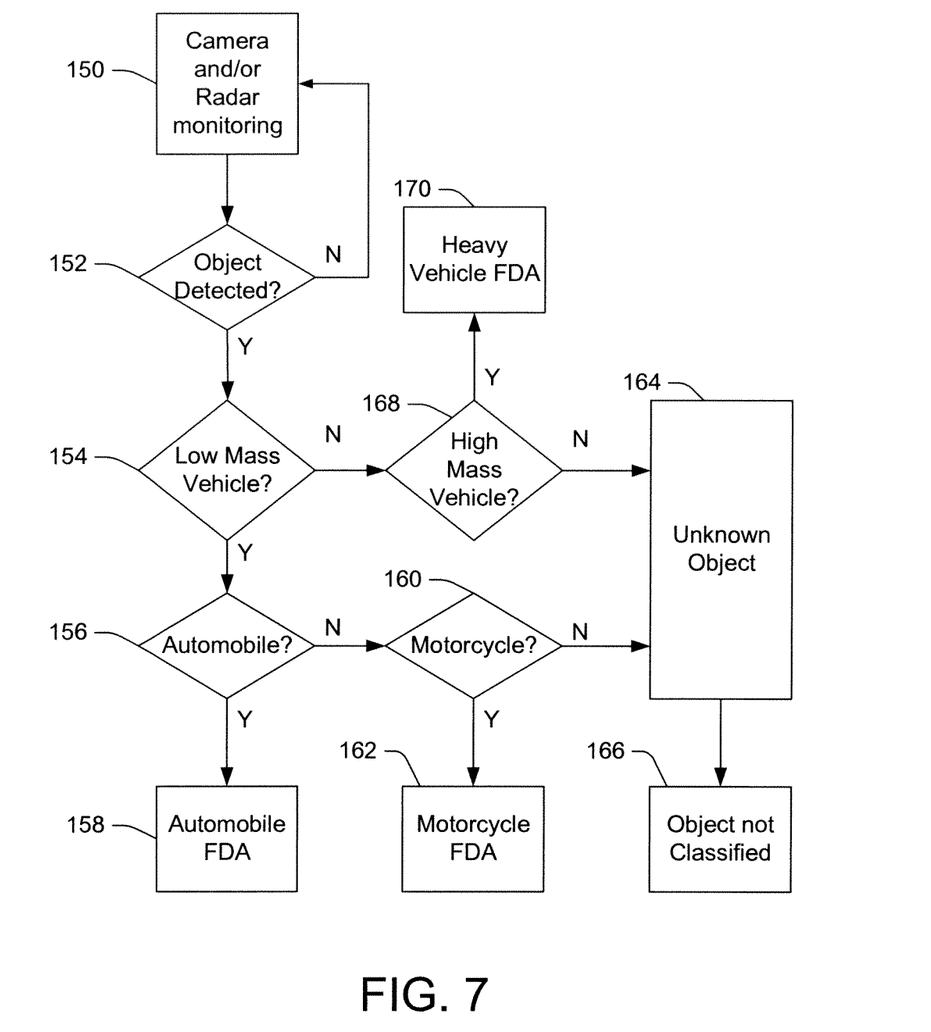
FIG. 7 illustrates a method of adjusting a FDA protocol for a host vehicle as a function of forward vehicle size and mass.

FIG. 7 illustrates a method of adjusting a following distance alert (FDA) protocol for a host vehicle as a function of forward vehicle size and mass. At 150, camera and/or radar forward monitoring is performed. At 152, a determination is made regarding whether a forward object has been detected. If not, then the method reverts to 150, where forward monitoring is continued. If a forward object is detected, then at 154, a determination is made regarding whether the object is a low mass vehicle, such as a car or motorcycle. If so, then at 156, a determination is made regarding whether the forward object is an automobile. If the forward object is determined to be an automobile or other 4-wheeled vehicle, then at 158, an automobile FDA protocol is implemented to set a first following distance for the host vehicle. If the object is determined not to be an automobile or other 4-wheeled vehicle at 156, then at 160 a determination is made regarding whether the object is a motorcycle or other 2-wheeled vehicle. If so, then at 162 a motorcycle FDA protocol is implemented to net a second following distance for the host vehicle, which is longer than the first following distance. If the determination at 160 indicates that the object is not a 2-wheeled vehicle or motorcycle, then at 164 the object is identified as "unknown." At 166, the object is not classified or otherwise ignored.

If the determination at 154 indicates that the vehicle is not a low-mass vehicle, such as a car, van, pickup truck, motorcycle, etc., then at 168 a determination is made regarding whether the vehicle is a high mass vehicle. If not, then the object is identified as "unknown" at 164. If the object is determined to be a high mass vehicle at 168, then at 178, a heavy vehicle FDA protocol is implemented to set a third following distance, which is shorter than the first following distance, for the host vehicle. The third following distance is shorter than the following distance prescribed by the first FDA because the detected vehicle is a high mass vehicle, which has longer stopping distance than a low mass vehicle, and therefore the host vehicle may follow at a closer distance (i.e., the following distance adjustment is inversely proportional to the weight of the host vehicle). In one embodiment, the heavy vehicle FDA assumes that the forward high mass vehicle is fully loaded, since a fully loaded vehicle will have a shorter stopping distance than an empty vehicle. If the assumption is incorrect (i.e., the forward vehicle is empty), then the forward vehicle will take longer to come to a complete stop than if empty. Thus the FDA is programmed to assume the shorter stopping distance for the forward high mass vehicle.

The determinations at 154 and 168 regarding the mass of the forward vehicle may be made, for instance, by comparing the size of the vehicle as determined from one or both of the radar signature or image thereof to a lookup table that correlates vehicle size to mass. The determined mass of the forward vehicle is then compared to a predetermined threshold (e.g., 4 tons or some other selected threshold), where objects below the threshold are considered low mass and those above the threshold are considered high mass.

It will be appreciated that the determinations of whether the object is a high mass vehicle, a low mass vehicle, or unknown may be performed in any order or concurrently. Similarly, the determinations of whether the forward object is an automobile, a motorcycle, or unknown may be performed in any order, or concurrently, and are not limited to the ordering represented in FIG. 7.

Figure 8:
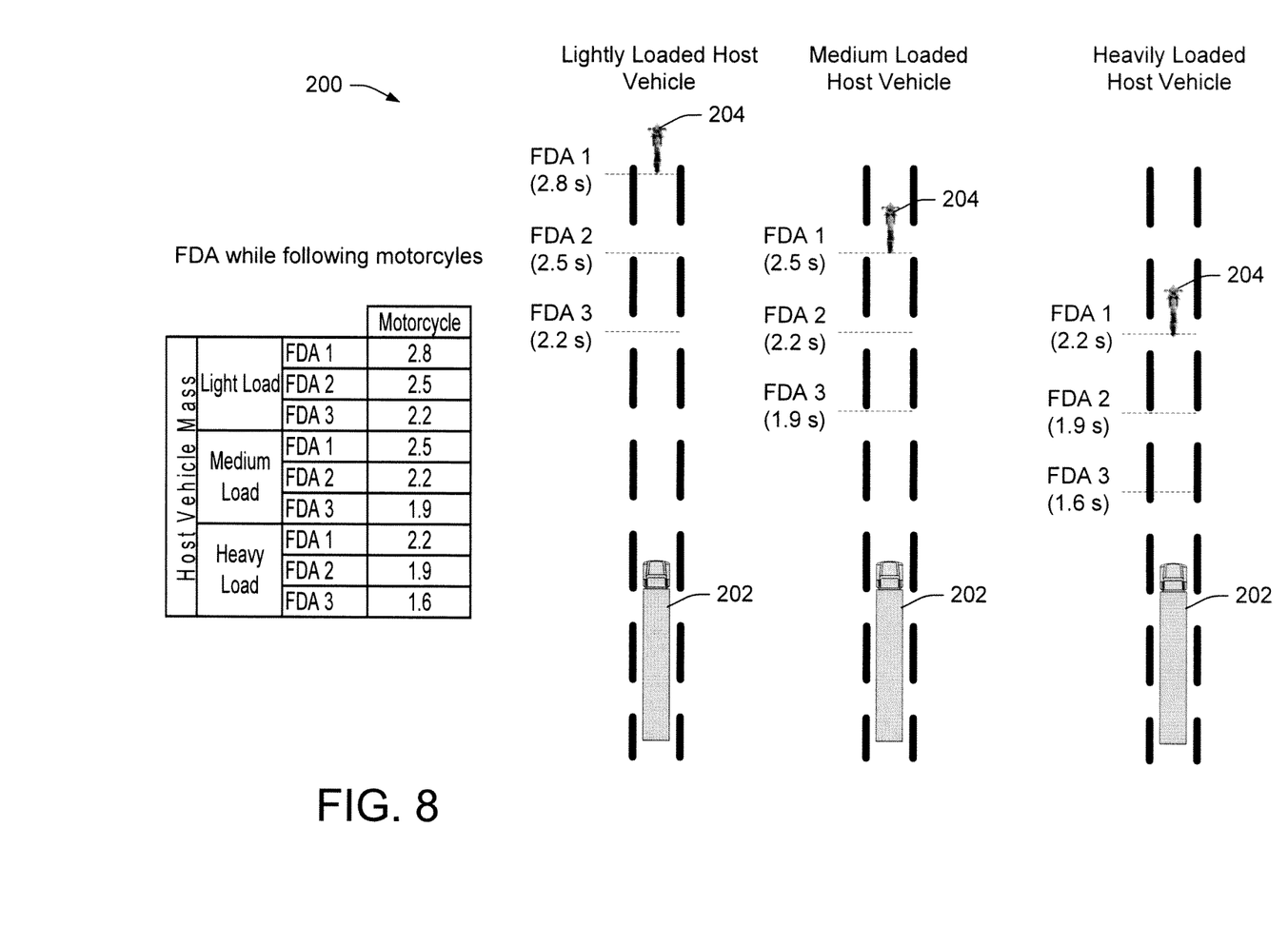
FIG. 8 illustrates a motorcycle FDA protocol, in which a host vehicle is following a forward vehicle that has been identified as a motorcycle.

FIG. 8 illustrates a motorcycle FDA protocol 200, in which a host vehicle 202 employing the systems and methods of FIGS. 1-7 is following a forward vehicle 204 that has been identified as a motorcycle. Three scenarios are considered in which the host vehicle has a varied mass. In a first scenario, the host vehicle is lightly loaded (or empty), such that it has a lesser amount of traction. Accordingly, three FDA levels are employed: FDA 1 is set to a following distance of 2.8 seconds; FDA 2 is set to a following distance of 2.5 seconds; and FDA 3 is set to a following distance of 2.2 seconds. If the motorcycle applies its brakes and breaches the first FDA level, a deceleration command is sent from the ACC module (FIGS. 1-5) that triggers the ECC (FIGS. 1-5) to initiate a first level of deceleration, such as dethrottling the engine, and a first alert may be provided to the driver (e.g., an audible tone or a visual indicator such as an LED indicator, a combination thereof, or the like). If the motorcycle further decelerates and breaches the second FDA level, a second alert is provided to the driver, and a second level of host vehicle deceleration is initiated (e.g., an engine retarder is activated, such as is described with regard to FIGS. 1-5). If the motorcycle breaches the third FDA level, then a third alarm may be provided to the driver and a third level of host vehicle deceleration is initiated, such as the foundation brakes of FIGS. 1-5. The third alert may also be provided to the driver to trigger the driver to manually depress the brake pedal to avoid a collision with the motorcycle.

In the second scenario, the host vehicle 202 is moderately loaded, and FDA 1, FDA 2, and FDA 3 are respectively set at 2.5 s, 2.2 s, and 1.9 s. That is, because the host vehicle is carrying a moderate load, it is heavier than in the first scenario, therefore having better traction and requiring less distance to stop. Accordingly, the host vehicle 202 is able to follow the forward vehicle 204 at a closer distance or time window than in the first scenario.

In the third scenario, the host vehicle 202 is heavily loaded, and FDA 1, FDA 2, and FDA 3 are respectively set at 2.2 s, 1.9 s, and 1.6 s. Again, because the host vehicle is carrying a heavy load, it is heavier than in the second scenario, therefore having better traction and requiring less distance to stop. Accordingly, the host vehicle 202 is able to follow the forward vehicle 204 at a closer distance or time window than in either of the first or second scenarios.

Figure 9:
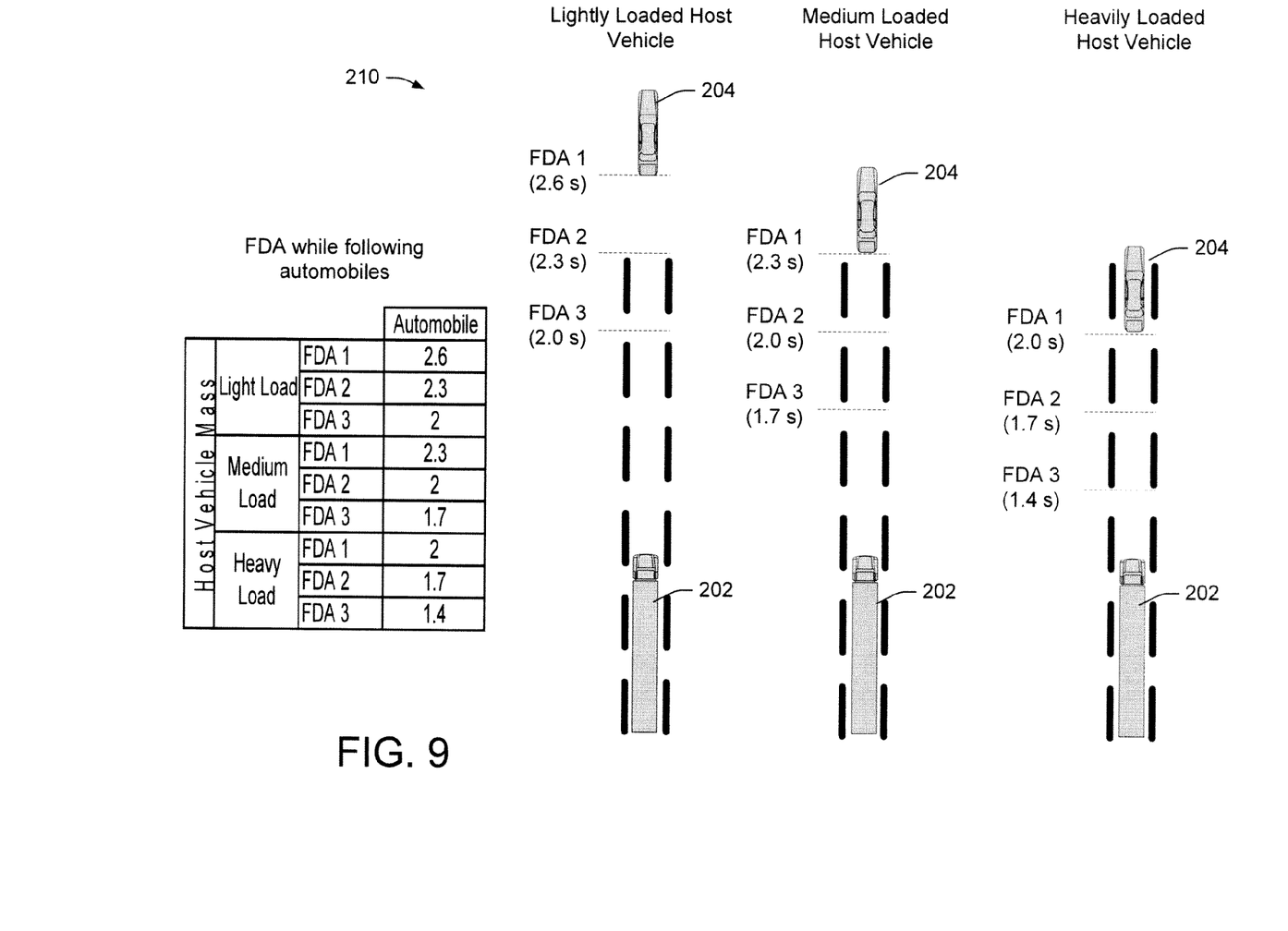
FIG. 9 illustrates an automobile FDA protocol, in which a host vehicle is following a forward vehicle that has been identified as an automobile.

FIG. 9 illustrates an automobile FDA protocol 210, in which a host vehicle 202 employing the systems and methods of FIGS. 1-7 is following a forward vehicle 204 that has been identified as an automobile. Three scenarios are again considered in which the host vehicle has a varied mass. In a first scenario, the host vehicle is lightly loaded (or empty), such that it has a lesser amount of traction. Accordingly, three FDA levels are employed: FDA 1 is set to a following distance of 2.6 seconds; FDA 2 is set to a following distance of 2.3 seconds; and FDA 3 is set to a following distance of 2.0 seconds. It will be noted that the FDA levels are smaller than those for the motorcycle FDA protocol 200 (i.e., the host vehicle follows the automobile at a closer interval than it does the motorcycle, which is permissible because the automobile requires a longer stopping distance than the motorcycle.

As in the scenarios of FIG. 8, if the automobile applies its brakes and breaches the first FDA level, a deceleration command is sent from the ACC module (FIGS. 1-5) that triggers the ECC (FIGS. 1-5) to initiate a first level of deceleration, such as dethrottling the engine, and a first alert may be provided to the driver. If the automobile further decelerates and breaches the second FDA level, a second alert is provided to the driver, and a second level of host vehicle deceleration is initiated (e.g., an engine retarder is activated, such as is described with regard to FIGS. 1-5). If the automobile breaches the third FDA level, then a third alarm may be provided to the driver and a third level of host vehicle deceleration is initiated, such as the foundation brakes of FIGS. 1-5. The third alert may also be provided to inform the driver to manually depress the brake pedal to avoid a collision with the automobile.

In the second scenario, the host vehicle 202 is moderately loaded, and FDA 1, FDA 2, and FDA 3 are respectively set at 2.3 s, 2.0 s, and 1.7 s. Since the host vehicle is carrying a moderate load, it is heavier than in the first scenario, therefore having better traction and requiring less distance to stop. Accordingly, the host vehicle 202 is able to follow the forward vehicle 204 at a closer distance or time window than in the first scenario.

In the third scenario, the host vehicle 202 is heavily loaded, and FDA 1, FDA 2, and FDA 3 are respectively set at 2.0 s, 1.7 s, and 1.4 s. Again, because the host vehicle is carrying a heavy load, it is heavier than in the second scenario, therefore having better traction and requiring less distance to stop. Accordingly, the host vehicle 202 is able to follow the forward vehicle 204 at a closer distance or time window than in either of the first or second scenarios.

Figure 10:
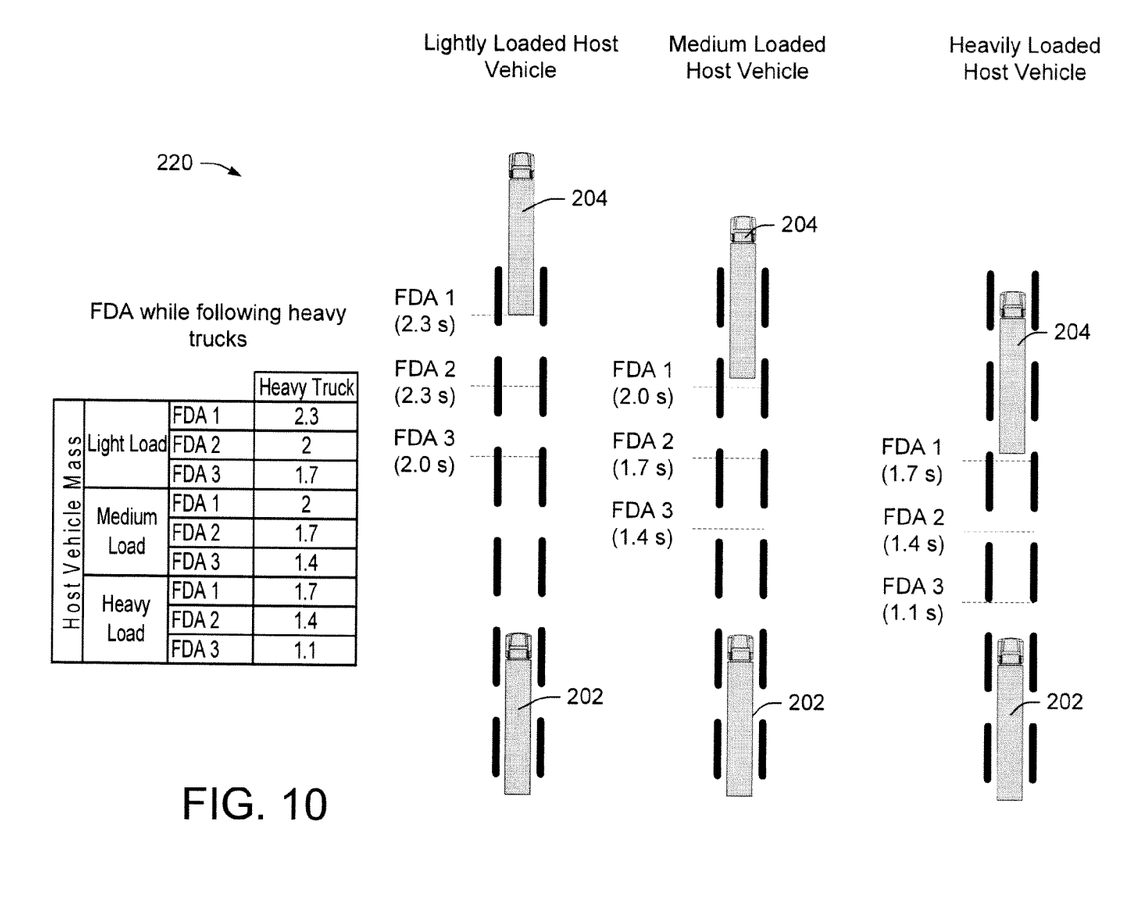
FIG. 10 illustrates a heavy vehicle FDA protocol, in which a host vehicle is following a forward vehicle that has been identified as a heavy vehicle.

FIG. 10 illustrates a heavy vehicle FDA protocol 220, in which a host vehicle 202 employing the systems and methods of FIGS. 1-7 is following a forward vehicle 204 that has been identified as a heavy vehicle (e.g., a tractor trailer, bus, or other vehicle with similar stopping characteristics to the host vehicle). Three scenarios are again considered in which the host vehicle has a varied mass. In a first scenario, the host vehicle is lightly loaded (or empty). Three FDA levels are employed: FDA 1 is set to a following distance of 2.3 seconds; FDA 2 is set to a following distance of 2.0 seconds; and FDA 3 is set to a following distance of 1.7 seconds. It will be noted that the FDA levels are smaller than those for the motorcycle FDA protocol 200 and the automobile FDA protocol 210 (i.e., the host vehicle follows the heavy vehicle at a closer interval than it does the motorcycle or automobile, which is permissible because the heavy vehicle requires a longer stopping distance than the motorcycle or automobile.

As in the scenarios of FIG. 8, if the heavy vehicle applies its brakes and breaches the first FDA level, a deceleration command is sent from the ACC module (FIGS. 1-5) that triggers the ECC (FIGS. 1-5) to initiate a first level of deceleration, such as dethrottling the engine, and a first alert may be provided to the driver. If the heavy vehicle further decelerates and breaches the second FDA level, a second alert is provided to the driver, and a second level of host vehicle deceleration is initiated (e.g., an engine retarder is activated, such as is described with regard to FIGS. 1-5). If the heavy vehicle breaches the third FDA level, then a third alarm may be provided to the driver and a third level of host vehicle deceleration is initiated, such as the foundation brakes of FIGS. 1-5. The third alert may also be provided to inform the driver to manually depress the brake pedal to avoid a collision with the heavy vehicle.

In the second scenario, the host vehicle 202 is moderately loaded, and FDA 1, FDA 2, and FDA 3 are respectively set at 2.0 s, 1.7 s, and 1.4 s. Since the host vehicle is carrying a moderate load, it is heavier than in the first scenario, therefore having better traction and requiring less distance to stop. Accordingly, the host vehicle 202 is able to follow the forward vehicle 204 at a closer distance or time window than in the first scenario.

In the third scenario, the host vehicle 202 is heavily loaded, and FDA 1, FDA 2, and FDA 3 are respectively set at 1.7 s, 1.4 s, and 1.1 s. Again, because the host vehicle is carrying a heavy load, it is heavier than in the second scenario, therefore having better traction and requiring less distance to stop. Accordingly, the host vehicle 202 is able to follow the forward vehicle 204 at a closer distance or time window than in either of the first or second scenarios.

It will be appreciated that the FDA levels and following distances/times described with regard to FIGS. 8-10 are provided for illustrative purposes and are not to be construed in a limiting sense.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An adaptive cruise-with-braking (ACB) system that adjusts host vehicle following distance as a function of forward vehicle size, including:
   a sensor on the host vehicle that detects the forward vehicle and classifies the forward vehicle as a function of the size of the forward vehicle;
   an electronic stability program (ESP) module that calculates a mass of the host vehicle; and
   an adaptive cruise control (ACC) module that selects and initiates one of a plurality of following distance alert (FDA) protocols as a function of the size of the forward vehicle and the mass of the host vehicle.

2. The system according to claim 1, wherein the sensor includes a radar sensor.

3. The system according to claim 2, wherein the radar sensor includes:
   a memory that:
      stores reference radar signature data for a plurality of differently-sized vehicles; and
      a lookup table (LUT) that correlates radar signature magnitude to vehicle size; and
   a processor that:
      receives a detected radar signature;
      compares the detected radar signature to a plurality of reference radar signatures;
      identifies one of the plurality of reference radar signatures that matches the detected radar signature; and
      performs a table lookup on the LUT to determine the size of the forward vehicle.

4. The system according to claim 3, wherein the sensor further includes a camera sensor that includes:
   a memory that:
      stores reference pixel and contrast profile (PCP) data for a plurality of differently-sized vehicles; and
      a lookup table (LUT) that correlates PCP information to vehicle size; and
   a processor that:
      receives a captured vehicle image;
      compares the captured vehicle image to the reference PCP data;
      identifies a reference PCP that matches the captured vehicle image; and
      performs a table lookup on the LUT to determine the size of the forward vehicle.

5. The system according to claim 1, wherein the sensor includes a camera sensor.

6. The system according to claim 5, wherein the camera sensor includes:
   a memory that:
      stores reference pixel and contrast profile (PCP) data for a plurality of differently-sized vehicles; and
      a lookup table (LUT) that correlates PCP information to vehicle size; and
   a processor that:
      receives a captured vehicle image;
      compares the captured vehicle image to the reference PCP data;
      identifies a reference PCP that matches the captured vehicle image; and
      performs a table lookup on the LUT to determine the size of the forward vehicle.

7. The system according to claim 1, wherein the sensor classifies the forward vehicle as being one of three sizes, the three sizes corresponding to:
   two-wheeled vehicles;
   four-wheeled passenger vehicles; and
   heavy commercial vehicles.

8. The system according to claim 7, wherein the plurality of FDA protocols include at least:
   a first FDA protocol that is initiated when the forward vehicle is classified as being of the size corresponding to heavy commercial vehicles;
   a second FDA protocol that is initiated when the forward vehicle is classified as being of the size corresponding to four-wheeled passenger vehicles; and
   a third FDA protocol that is initiated when the forward vehicle is classified as being of the size corresponding to two-wheeled vehicles;
   wherein following distances prescribed by the first FDA protocol are shorter than following distances prescribed by the second FDA protocol, which in turn are shorter than following distances prescribed by the third FDA protocol.

9. The system according to claim 1, wherein the ACC uses mass of the host vehicle calculation to adjust a following distance prescribed by the selected FDA protocol, where the adjustment is inversely proportional to the mass of the host vehicle.

10. The system according to claim 1, further including a driver interface that receives from the ACC, and presents to the driver, an alert when the forward vehicle is within one or more following distances prescribed by the FDA protocol.

11. A method for adjusting host vehicle following distance as a function of forward vehicle size, including:
   detecting a forward object in front of the host vehicle;
   determining whether the forward object is a low-mass vehicle, a high mass vehicle, or an unclassified object;
   when the forward object is determined to be the low mass vehicle, determining whether the vehicle is an automobile or a motorcycle;
   initiating an automobile following distance alert (FDA) protocol when the forward vehicle is determined to be the automobile;
   initiating a motorcycle FDA protocol when the forward vehicle is determined to be the motorcycle; and
   initiating a heavy vehicle FDA protocol when the forward vehicle is determined to be a heavy vehicle.

12. The method according to claim 11, further comprising detecting the forward object using a radar sensor.

13. The method according to claim 12, wherein the detecting the forward object includes:
   receiving a detected radar signature;
   comparing the detected radar signature to a plurality of pre-stored reference radar signatures for a plurality of vehicle sizes;
   identifying one of the plurality of reference radar signatures that matches the detected radar signature; and
   performing a table lookup on a lookup table (LUT) that correlates radar signature magnitude to vehicle size to determine the size of the forward vehicle;
   wherein larger vehicle size is correlated to larger vehicle mass.

14. The method according to claim 13, wherein the detecting the forward object is performed using a camera sensor and further includes:
   receiving a captured vehicle image;
   comparing the captured vehicle image to reference PCP data for a plurality of differently-sized vehicles;
   identifying a reference PCP that matches the captured vehicle image; and
   performing a table lookup on a lookup table (LUT) that correlates PCP information to vehicle size to determine the size of the forward vehicle;
   wherein larger vehicle size is correlated to larger vehicle mass.

15. The method according to claim 11, further comprising detecting the forward object using a camera sensor.

16. The method according to claim 15, further including:
   receiving a captured vehicle image;
   comparing the captured vehicle image to reference PCP data for a plurality of differently-sized vehicles;
   identifying a reference PCP that matches the captured vehicle image; and
   performing a table lookup on a lookup table (LUT) that correlates PCP information to vehicle size to determine the size of the forward vehicle;
   wherein larger vehicle size is correlated to larger vehicle mass.

17. The method according to claim 11, wherein following distances prescribed by the motorcycle FDA protocol are longer than following distances prescribed by the automobile FDA protocol, which in turn are longer than following distances prescribed by the heavy vehicle FDA protocol.

18. The method according to claim 11, further comprising adjusting a following distance prescribed by the initiated FDA protocol, where the adjustment is inversely proportional to the mass of the host vehicle.

19. A non-transitory computer-readable medium having stored thereon instructions for performing the method of claim 11.

20. A system that facilitates adjusting following distance for a host vehicle as a function of host vehicle mass and forward vehicle size, including:
   a sensor that detects the position of a forward vehicle relative to the host vehicle in which the sensor is installed; and
   a processor that:
      classifies the forward vehicle as one of a motorcycle, a passenger automobile, and a heavy vehicle;
      initiates a following distance alert (FDA) protocol selected as a function of the forward vehicle classification the FDA protocol including one or more prescribed following distance limits; and
      adjusts the one or more following distance limits as a function of host vehicle mass, wherein the following distance adjustment is inversely proportional to the mass of the host vehicle.

* * * * *

UNITED STATES PATENT AND TRADEMARK OFFICE
CERTIFICATE OF CORRECTION

PATENT NO. : 8,493,196 B2
APPLICATION NO. : 12/946159
DATED : July 23, 2013
INVENTOR(S) : Ananda Pandy It is certified that error appears in the above-identified patent and that said Letters Patent is hereby corrected as shown below:

In the Specification

Column 6, line 52, "net" should read --set--.

Signed and Sealed this
Twenty-seventh Day of August, 2013

Teresa Stanek Rea
*Acting Director of the United States Patent and Trademark Office*